United States Patent [19]
Kim

[11] Patent Number: 6,108,034
[45] Date of Patent: Aug. 22, 2000

[54] REMOTE IMAGE INFORMATION MONITOR

[75] Inventor: Heung-soo Kim, Ansan, Rep. of Korea

[73] Assignee: Samsung Electronics Co., Ltd, Kyungki-do, Rep. of Korea

[21] Appl. No.: 09/064,608

[22] Filed: Apr. 23, 1998

[30]     Foreign Application Priority Data

Jun. 18, 1997 [KR]    Rep. of Korea ................. P97-25397

[51] Int. Cl.⁷ .................................................. H04N 7/18
[52] U.S. Cl. ............................................................ 348/154
[58] Field of Search ................................ 348/143–159, 348/152, 153, 154; H04N 7/18

[56]              References Cited

U.S. PATENT DOCUMENTS

| | | | |
|---|---|---|---|
| 4,511,886 | 4/1985 | Rodriguez | 340/534 |
| 4,876,597 | 10/1989 | Roy et al. | 348/143 |
| 4,951,147 | 8/1990 | Aknar et al. | 348/143 |
| 5,202,759 | 4/1993 | Laycock | 348/152 |
| 5,717,379 | 2/1998 | Peters | 340/539 |

FOREIGN PATENT DOCUMENTS

| | | | |
|---|---|---|---|
| 3-71737 | 3/1991 | Japan | H04J 14/02 |
| 6-274782 | 9/1994 | Japan | G08B 25/08 |
| 8-149106 | 6/1996 | Japan | H04J 14/00 |
| 9-153905 | 6/1997 | Japan | H04L 12/28 |
| 96-28633 | 7/1996 | Rep. of Korea | H04Q 7/00 |
| 2 253 121 | 8/1992 | United Kingdom . | |
| 2 311 906 | 10/1997 | United Kingdom . | |

OTHER PUBLICATIONS

"Expectations for Recognition Understanding in Security Service", Denshi Joho Tsushin Gakkai Gijutsu Kenkyu Hokoku (Electronic Information Communication Meeting Technical Research Report), vol. 97, No. 113, Pattern Recognition Media Understanding (PRMU 97–48–54), PP. 49–55.

"Latest Trends of Computer Systems for the Traffic Field", Mitsubishi Denki Giho, vol. 70, No. 7, pp. 63–70.

*Primary Examiner*—Howard Britton
*Attorney, Agent, or Firm*—Sughrue, Mion, Zinn Macpeak & Seas, PLLC

[57]              ABSTRACT

There is provided a remote image information monitor for monitoring a remote location in images, using an asymmetric high-speed data modem. The remote image information monitor includes a plurality of remote devices, respectively installed at the plurality of remote locations, for transmitting ambient state information of the remote location and an image for the monitored ambient situation. A toll center selects one of the plurality of remote devices according to the state information received from the remote devices, receives the image transmitted from the remote devices, and displays the received image from the selected remote device on a display screen.

7 Claims, 3 Drawing Sheets

REMOTE IMAGE INFORMATION MONITOR

BACKGROUND OF THE INVENTION

1. Field of the Invention

The present invention relates to a remote image information monitor, and more particularly, to a monitor for monitoring a remote location in images through a phone line using an asymmetric high-speed data modem through a phone line.

2. Description of the Related Art

FIG. 1 is a block diagram of a general remote location managing device. The general remote location managing device has a state monitoring controller 150, a plurality of dial-up base station modems 142 and 144, and a plurality of subscriber devices 110 and 120. The subscriber device 110 includes a dial-up branch modem 113, a state monitor 112, and a sensor 111, and the subscriber device 120 includes a dial-up branch modem 123, a state monitor 122, and a sensor 121.

As shown in FIG. 1, the subscriber devices 110 and 120 each transmit state information to the state monitoring controller 150 via the dial-up base station modems 142 and 144 connected to phone lines 132 and 134, respectively. That is, the state monitors 112 and 122 receive ambient state information sensed by the respective sensors 111 and 121, and transmit the state information to the respective dial-up branch modems 113 and 123. The state monitoring controller 150 issues an alarm depending on the type of state information received from the respective dial-up branch modems 113 and 123, and the dial-up base station modems 142 and 144. At the alarm, an operator is dispatched to the remote location to handle the situation.

Failures in the sensors 111 and 121 are highly likely to bring about malfunction of a system since the situation at a remote location can only be judged from state information sensed by the sensors 111 and 121. Therefore, it is difficult to differentiate between an emergency and a malfunction induced by user carelessness. In addition, disconnection of a phone line impedes immediate indication of the situation.

SUMMARY OF THE INVENTION

To solve the above problems, it is an object of the present invention to provide a remote image information monitor for monitoring a remote location in images, using an asymmetric high-speed modem.

Accordingly, to achieve the above object, there is provided a remote image information monitor comprising a plurality of remote devices, respectively installed at the plurality of remote locations, for transmitting ambient state information of the remote location and an image for monitored ambient situation; and a toll center for selecting one of the plurality of remote devices according to the state information received from the remote devices, receiving the image transmitted from the remote devices and displaying the same on a display screen.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

Figure 1:
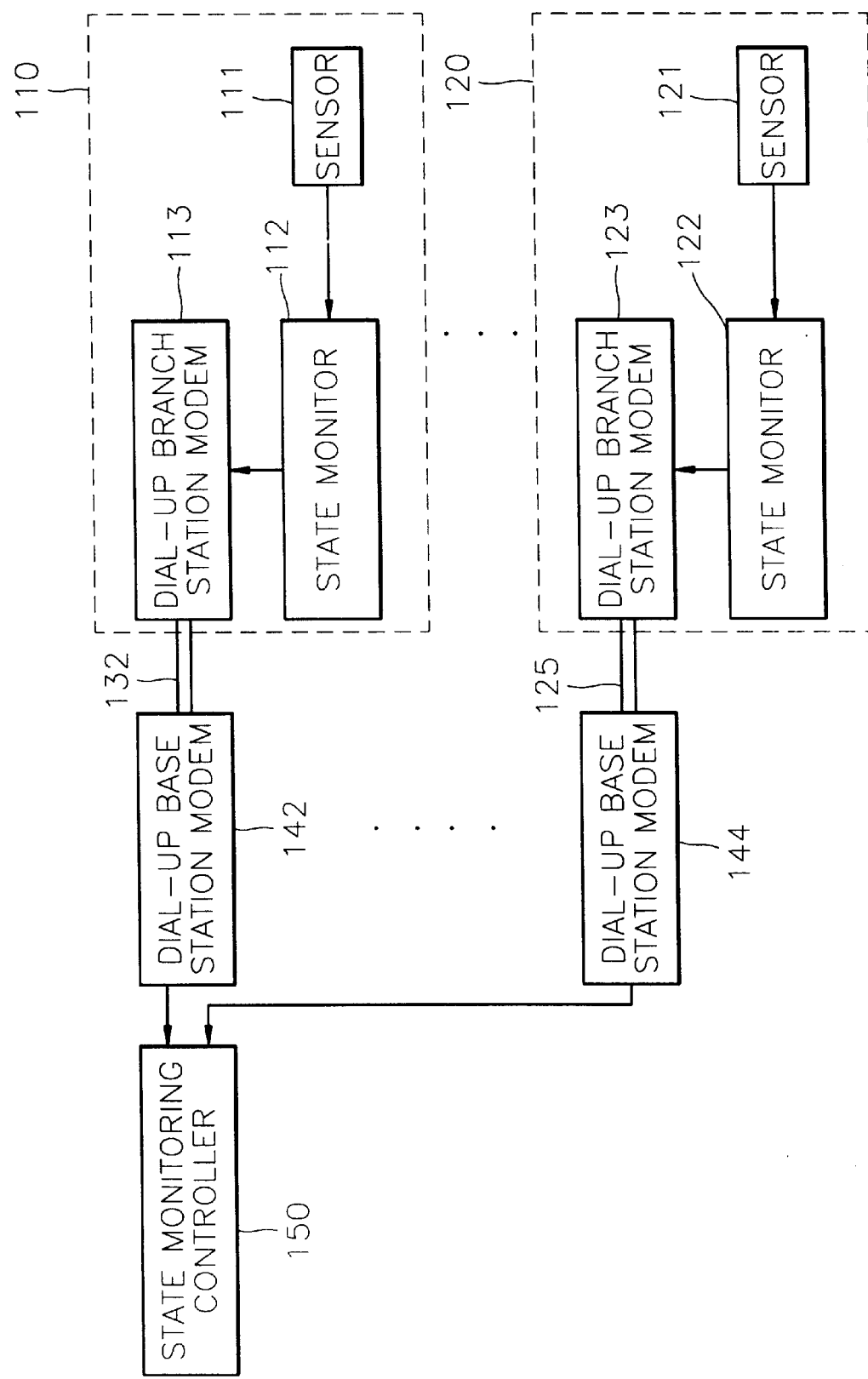
FIG. 1 is a block diagram of a conventional remote managing device.
Figure 2:
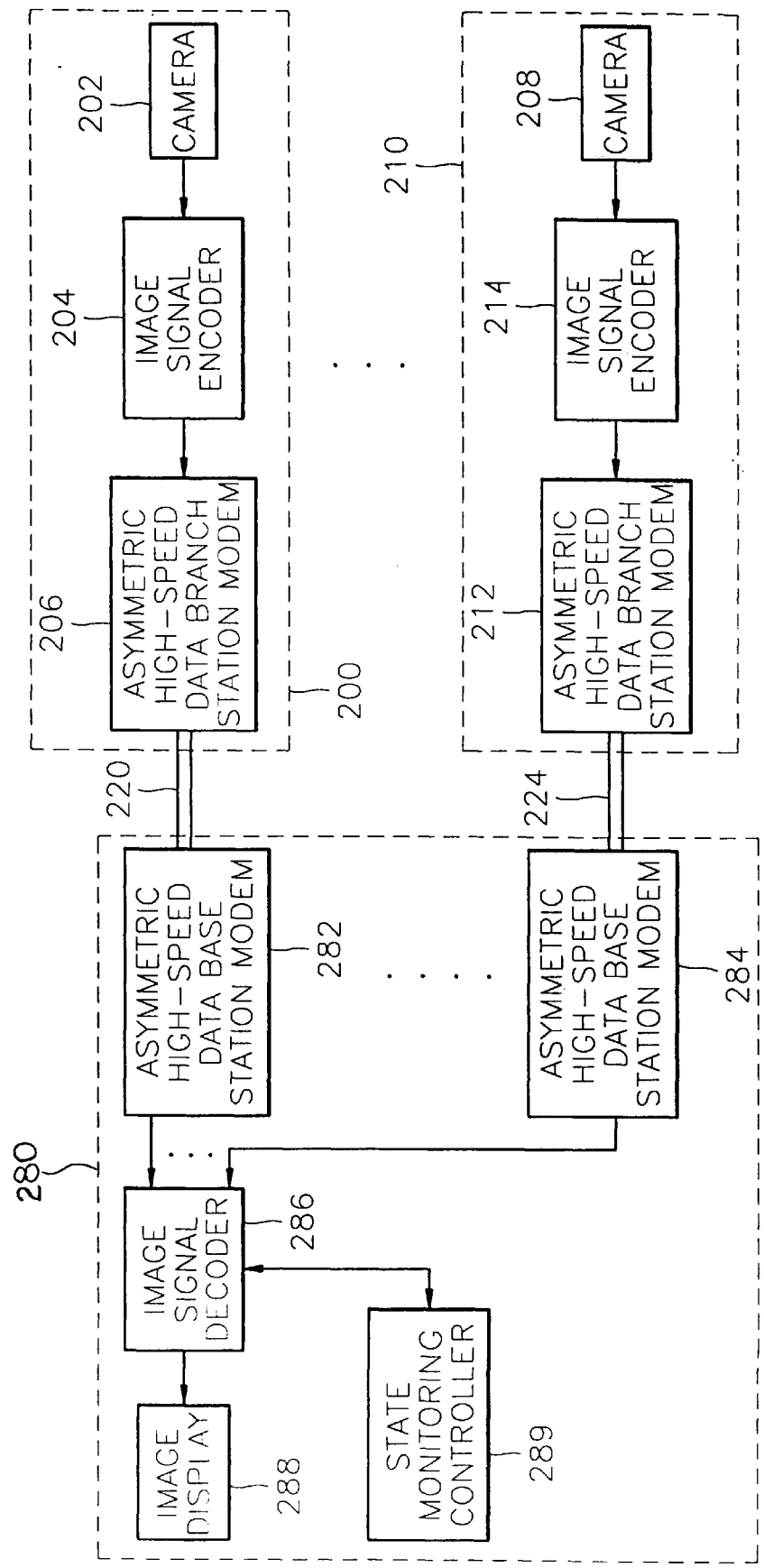
FIG. 2 is a block diagram of a remote image information monitor according to an embodiment of the present invention.

As shown in FIG. 2, a remote image information monitor of the present invention has a plurality of remote devices 200 and 201 installed at a remote location, for monitoring the remote location, and a toll center 280 for selecting one of the plurality of remote devices 200 and 210 and receiving image information from the selected remote device. The remote device 200 has a camera 202, an image signal encoder 204, and an asymmetric high-speed data branch modem 206. The remote device 210 has a camera 208, an image signal encoder 214, and an asymmetric high-speed data branch modem 212. The toll center 280 includes a plurality of asymmetric high-speed data base station modems 282 and 284, an image signal decoder 286, an image display 288, and a state monitoring controller 289.

The remote devices 200 and 210, as shown in FIG. 2, each transmit image data of the remote location to the toll center 280 via channels 220 and 224, while maintaining a communications line in a steady state in cooperation with the toll center 280. The state monitoring controller 230 in the toll center 280 selects images and state information of the remote location selected by an operator and can monitor the remote location, relying on the selected images and state information. That is, the cameras 202 and 208 each convert optical signals of an intended location to be monitored into an electrical signal (e.g., an analog video signal). The image signal encoders 204 and 214 each encode the analog video signal output from the cameras into digital video data suitable for a transfer speed of a high-speed data modem, and transmit the encoded digital video data to the asymmetric high-speed data branch station modems 206 and 212, respectively.

The asymmetric high-speed data branch station modems 206, 212, 220, and 224 each use an asymmetric digital subscriber line (ADSL) method. ADSL is a transmission technology used for providing a video signal through a conventional phone line in a video-on-demand service which uses asymmetry because the downstream channel transferred from a video server to a subscriber has a much larger bandwidth than the upstream channel transferred from the subscriber to the video server. The asymmetric high-speed data branch modems 206 and 212 modulate the received digital video data into an analog video signal and transmit the analog signal to the asymmetric high-speed base station modems 282 and 284 via unilateral channels 220 and 224 having wide bandwidths. The asymmetric high-speed data base station modems 282 and 284 each demodulate the received analog video signal into digital video data. Here, the asymmetric high-speed modems 206, 212, 282, and 284 have no impact on conventional phone calls, obviating the need for an additional transmission line. The image signal decoder 286 decodes the digital video data output from one of the asymmetric high-speed data base station modems 282 and 284 to images according to TV standards. The state monitoring controller 289 controls the image signal decoder 286 to select one of the asymmetric high-speed data base station modems 282 and 284 automatically or according to a user selection. The image display 288 displays a video signal received from the image signal decoder 286 in predetermined characters or graphics.

Figure 3:
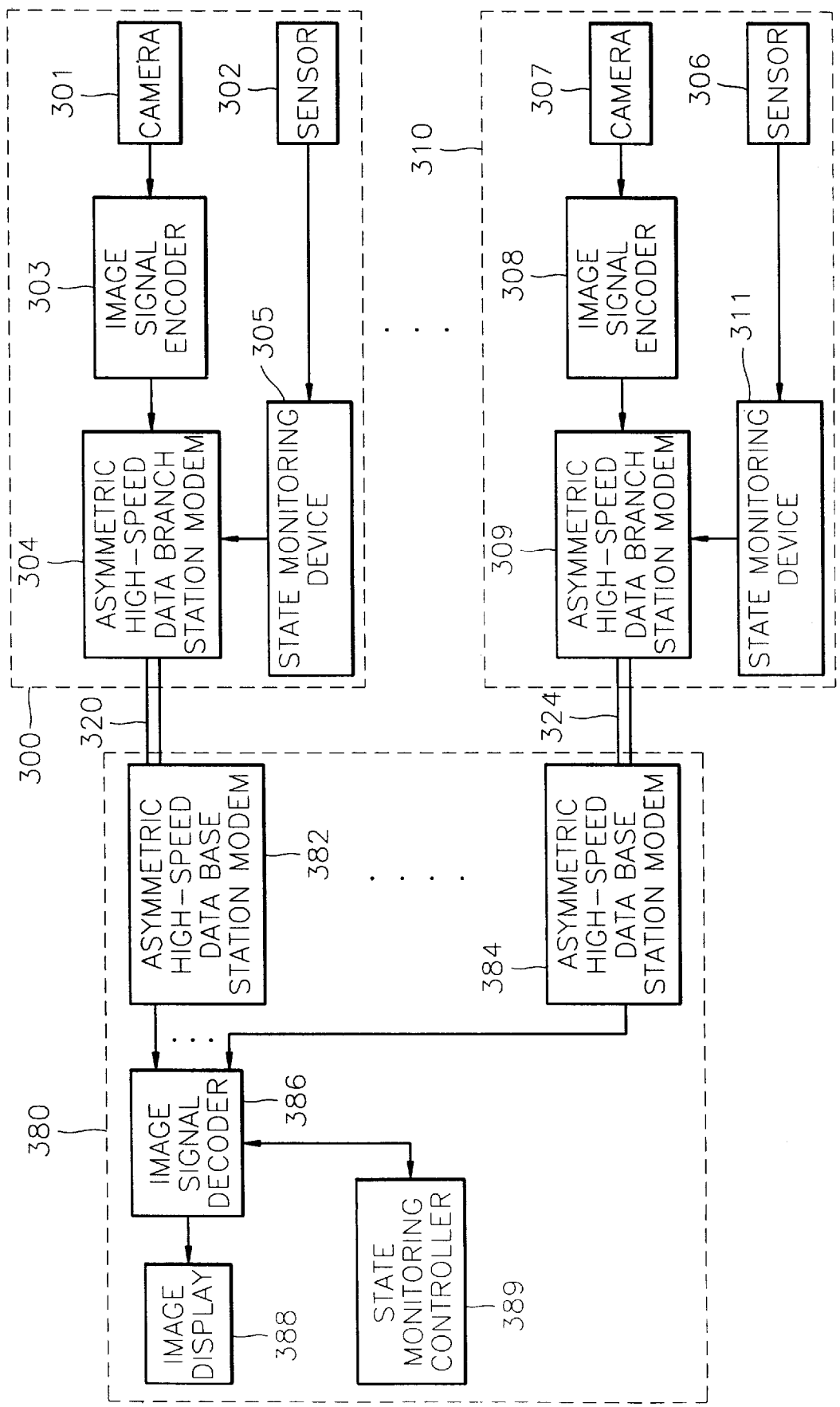
FIG. 3 is a block diagram of a remote image information monitor according to another embodiment of the present invention.

FIG. 3 is a block diagram of a remote image information monitor according to another embodiment of the present invention. The remote image information monitor has a plurality of remote devices 300 and 310, and a toll center 380 for selecting one of the plurality of remote devices 300 and 310 and receiving image information from the selected remote device. The remote device 300 has a camera 301, an image signal encoder 303, an asymmetric high-speed data branch modem 304, and a state monitoring device 305. The remote device 310 has a camera 307, an image signal encoder 308, an asymmetric high-speed data branch station modem 309, and a state monitoring device 311. The toll center 380 includes a plurality of asymmetric high-speed data base station modems 382 and 384, an image signal decoder 386, an image display 388, and a state monitoring controller 389.

The device of FIG. 3 is the same as that of FIG. 2, except that the state monitoring devices 305 and 311 and the sensors 302 and 306 are added to the remote devices 200 and 210. The sensors 302 and 306 each sense ambient states or conditions in a predetermined location. The state monitoring devices 305 and 311 each collect a state information sensed by the sensors 302 and 306 and convert the collected state information to specified state information data. The asymmetric high-speed data branch station modems 304 and 309 modulate the state information data received from the respective state monitoring devices 305 and 310 and the digital video data generated from the cameras 301 and 307 and the image signal encoders 303 and 308 to analog signals, and transmit the analog signals to the asymmetric high-speed data base station modems 382 and 384 via channels 320 and 324 having smaller bandwidths than unilateral channels. The asymmetric high-speed data base station modems 382 and 384 each demodulate the analog state information and video signal received from the asymmetric high-speed data branch station modems 304 and 309 into the digital state information data and video data and transmit the received state information to the image signal decoder 386 regardless of selection of the state monitoring controller 389. The image signal decoder 386 passes the state information output from the asymmetric high-speed data base station modems 382 and 384, and decodes the digital video data output from the asymmetric high-speed data base station modems 382 and 384 to images satisfying TV standards. The state monitoring controller 389 may issue a visible and audible alarm according to the state information received from the image signal decoder 386. Otherwise, the state monitoring controller 389 selects one of the asymmetric high-speed data base station modems 382 and 384 according to the content of the state information and outputs the corresponding video data. The image display 388 displays the video data received from the image signal decoder 386 in predetermined characters or graphics.

According to the present invention as described above, a sensor in a remote location senses an ambient state and sends information of the ambient state to the state monitoring controller. Then, an operator checks the situation of the remote location by the image displayed on a screen and takes proper actions. Thus, unnecessary dispatch of personnel can be prevented. Even if a phone line is disconnected, this is immediately perceived since a communications channel is maintained between a remote device and a toll center. Further, in the case of an automated security system, when an abnormal situation occurs, the situation is transmitted to an operator side in the form of images, thereby enabling immediate actions.

While the present invention has been illustrated and described with reference to specific embodiments, further modifications and alterations will occur to those skilled in the art within the spirit and scope of this invention.

What is claimed is:

1. A remote image information monitor system comprising:

a plurality of remote devices, respectively installed at a plurality of remote locations, each of the remote devices continuously transmitting ambient state information of a respective one of the remote locations and image data of a monitored ambient situation at the respective one of remote locations; and a toll center for receiving the ambient state information and image data of the monitored ambient situation from the remote devices automatically selecting one of the remote devices according to the state information received from the remote devices, and displaying the image data received from the selected remote device on a display screen.

2. The remote image information monitor as claimed in claim 1, wherein each of the plurality of remote devices comprises:

a camera for converting image information of the ambient situation into an electrical video signal;

a state monitor for receiving a state sensed by a sensor and converting the sensed state to state information;

an image signal encoder for receiving the electrical video signal from the camera and converting the electrical video signal into video data; and a first modem for modulating the video data from the image signal encoder and the state information generated by the state monitor into an analog video signal and an analog state signal, respectively.

3. The remote image information monitor as claimed in claim 2, wherein the first modem is an asymmetric high-speed modem.

4. The remote image information monitor as claimed in claim 2, wherein the toll center comprises:

a plurality of second modems for demodulating the state signal and video signal modulated by the first modem in each of the plurality of remote devices to generate state information and video data;

an image signal decoder for receiving the state information and video data demodulated by the second modems and decoding the received video data;

a state monitoring controller for controlling the image signal decoder to selectively receive video data from the plurality of second modems according to the state information received from the image signal decoder; and a display for displaying the decoded video data generated by the image signal decoder.

5. The remote image information monitor as claimed in claim 4, wherein the second modem is an asymmetric high-speed modem.

6. The remote image information monitor as claimed in claim 4, wherein the state monitoring controller controls image data to be selectively received according to user demands.

7. The remote image information monitor as claimed in claim 4, wherein the state monitoring controller issues an alarm according to the content of the state information.

* * * * *